Oct. 16, 1956  W. M. ROSS  2,767,386
MULTIPLE SECTOR SEARCH SONARS
Filed Feb. 25, 1953  5 Sheets-Sheet 1

INVENTOR.
WAYNE M. ROSS
BY
Reynolds, Beach & Christensen
ATTORNEYS

Fig. 5.

United States Patent Office 2,767,386
Patented Oct. 16, 1956

2,767,386
MULTIPLE SECTOR SEARCH SONARS

Wayne M. Ross, Seattle, Wash., assignor to Minneapolis-Honeywell Regulator Company, Minneapolis, Minn., a corporation of Delaware Application February 25, 1953, Serial No. 338,795

12 Claims. (Cl. 340—6)

This invention relates to systems for detecting the presence and location of remote objects by means of propagative wave energy reflected from such objects. A general purpose of the invention is a detection system capable of covering a relatively wide search sector in a shorter period of time than is normally possible of achievement by known or conventional techniques.

The invention is herein illustratively described by reference to its application in a pulse-echo type range and angle determining sonar for underwater searching with recurrent ultrasonic compressional wave energy pulses. It should be understood, however, that certain variations and changes therein may be made and certain subcombinations or features of the invention may be employed independently without departing from underlying essentials comprising the invention as defined in the appended claims.

Although compressional wave energy propagates in water at appoximately four times the velocity in air, it still requires about 200,000 times as long for compressional wave energy to travel a given distance or range to and from a reflecting underwater object as it does for electromagnetic wave energy to travel in space the same out and back distance. A search type radar operating on the pulse-echo principle and capable of rapid panoramic or sector scan of a relatively wide sector out to great distances is feasible for the one reason that electromagnetic energy does propagate at such high speed that the angular movement of the radar beam, though rapid, does not cause the loss of echoes from reflecting objects even at great distances. In other words, before the angular position of the scanning beam can change materially after the emission of a pulse of electromagnetic wave energy the related echoes even from the most distant objects of interest have all returned to the system for detection. However, in the case of an underwater sonar wherein scanning of a search sector is carried out with a narrow beam swept one or more times across the sector, the maximum range requirements and the desire for a narrow beam providing good angular resolving power impose a definite limitation upon the permissive maximum rate of angular scan due to the relatively slow speed of sound wave propagation.

For example, if the effective width of the scanning compressional wave energy beam, transmitting or receiving, is 10° and the desired maximum range of the system is 2,000 feet, the angular scan rate should be less than 10° per second if at least one echo from a discrete object at the maximum range is to be received. In practice, two, three or more echoes from each object at maximum range during each sweep of the beam across the sector are desirable, so that the maximum angular scan rate is preferably even slower than the figure named above under the assumptions stated.

Assuming a scanning type pulse-echo sonar with a 10° beam and a 2,000 foot maximum range is scanned at an angular rate permitting a minimum of two echo pulses to be received from objects at maximum range, it would require approximately 16 seconds to scan through a sector of 90°. If no motion occurs between reflecting objects in the field of scan or between such objects and the detecting station, i. e. the vessel carrying the sonar, for instance, such a slow angular rate of scan may not be objectionable. In most potential applications of a search type sonar, however, relative motion and frequently very rapid relative motion between reflecting objects or between such objects and the detecting station may take place. This is true of such applications as submarine detection, marine navigation, locating schools of fish, etc. If signal markings representing the positions of reflecting objects are displayed on a cathode ray tube plan position indicator (P. P. I.), for instance, it becomes extremely difficult and sometimes impossible to correlate the signal markings showing a moving object which occur on successive sweeps of the search beam through the sector. Thus it becomes difficult to assign these time-spaced signals to the same object, and tracking the object may be impossible. Moreover, if the object moves very fast or crosses only a corner or side of the search sector, for instance, such object may escape detection altogether because of the relatively slow angular scan of the beam.

It has therefore appeared that a straightforward scanning type search sonar, using former techniques, can be most effective only if operated at relatively high pulse repetition rates permitting only short maximum range. Otherwise angular resolving power or angular scan rate must suffer. Alternatively fewer echoes from each object on one angular sweep of the search sector must be tolerated, resulting in less sensitive and reliable detection of objects.

The same type of problem can arise in radar systems as in compressional wave systems, if the ratio of either angular scan rate or maximum desired range to velocity of propagation of electromagnetic waves becomes relatively high. The principles of the present invention as hereinafter disclosed are applicable, therefore, not only to the problems of compressional wave systems, but also to analogous electromagnetic or other propagative energy systems.

An object of the present invention is an effective detecting system of the pulse-echo type capable of simultaneously covering or searching all portions of a relatively wide search sector, up to and including 360°, if desired, as distinguished from the formerly proposed method of a narrow beam swept slowly across the sector. The invention permits of achieving such coverage with any desired or practically achievable angular resolving power. Moreover, the angular resolution of the system may be made greater in one portion of the sector than in another, if desired, although normally it would be uniform throughout the entire sector.

Another object of the invention is a continuous sector-coverage detecting system which lends itself in certain basic respects to the determination of angular position of discrete reflecting surfaces or remote energy sources relative to the detecting station, whether by use of continuous-wave energy or recurrent pulses of energy. If the pulse-echo principle is used, as would usually be desired, the system furnishes both angle and range information; furthermore it is adapted for indicating all such information on a single indicating device such as a plan position indicator of the cathode ray tube type.

In accordance with this invention a plurality of directionally selective receiving devices, i. e. transducers, respectively covering successively adjacent portions of the total search sector respond selectively to the reflections of propagative wave energy transmitted into all portions of the total sector simultaneously. A further object of the invention is to provide an efficient and practical apparatus for resolving and separately displaying on a single indicator, such as a cathode ray tube indicator, the response signals of all the individual receiving devices, such that the signal markings are positionally related in a manner representative of the relative directions of the reflecting objects producing the echo signals. When operating such a system on the recurring pulse-echo principle the indicator may be adapted for indicating both the direction and range of all such objects on a single indicator screen, as previously mentioned.

Another object is an efficient electrical switching arrangement which, during a short interval, such as a very small fraction of the period between successive transmitted pulses, momentarily "samples" or detects the responses of individual receiving devices in predetermined sequence, and preferably repeats this operation a great many times during each inter-pulse interval for indicating purposes. In a pulse operated system each such sequence cycle is preferably only a fraction of the pulse duration, so that each echo signal is impressed on the indicator at least once, and preferably oftener. A preferred type of sequence switching circuit is disclosed which introduces little or no interference in the receiving channels due to switching transients which might tend to obscure true signal indications, or require suppression by special filters rendering the receiving system also less sensitive to desired echo signals.

In principle the illustrative detecting system comprises transmitter means operable for beaming propagative wave energy into a desired search sector, a plurality of receiving devices directionally selective to reflections in successively adjacent portions of the total sector, indicator means such as a cathode ray tube indicator having a viewing screen, means for sweeping the electron beam of the cathode ray tube along a selected path relative to the viewing screen recurringly, and cathode ray tube beam control means operated synchronously with the beam sweep means and sequentially converting the individual receiver responses into visible effects of the beam trace during successively connected portions of the beam sweep, which portions are positionally related respectively to the successively adjacent portions of the search sector.

According to another feature of the invention the transmitter is operated to produce periodic pulses of energy and the beam control means referred to above effecting sequential conversion of the receiver responses is operated at a recurrence rate such that the time interval between successive sequences thereof is less than or is, preferably, a small fraction of the pulse duration.

Still another feature of the system is the provision of a cathode ray tube indicator in which the electron beam is also swept in a sense generally transverse to the first-mentioned sweep sense in progressive fashion commencing with each pulse transmission, so that range as well as angular position of reflecting objects is indicated on the screen. In the preferred design the first-mentioned sweep means produces a circular scan of the cathode ray tube electron beam while the second-mentioned sweep means produces a progressive widening of the sweep circle, resulting in a spiral trace. By intensity modulating the electron beam with echo signals received a type of indication similar to conventional plan position indication is achieved.

As a more specific feature of the illustrative apparatus embodying the invention, the sequential switching or scanning of receiver devices for application of their individual responses to the indicator is accomplished by applying such responses to individual bias-controlled amplifiers having a common output channel and having individual bias-overcoming circuits of the tuned detector circuit type. Such detector circuits are tuned to successively different frequencies and are subjected to the output of a variable frequency oscillator whose frequency is progressively and recurringly varied over a predetermined range, so as to overcome the bias of said amplifiers in successive order a great many times during each interval between successive transmitted pulses.

These and other features, objects and advantages of the invention will become more fully evident from the following description thereof by reference to the embodiment illustrated in the accompanying drawings.

Figure 1:
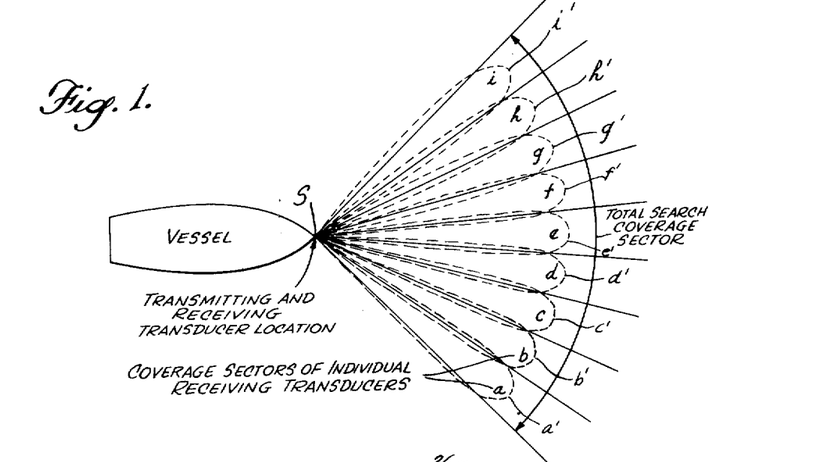
Figure 1 is a simplified plan view diagramming the sector coverage of an illustrative search system from a marine vessel.

For convenience it is assumed that the system transmitting and receiving apparatus are located at the same point, designated S in Figure 1. In the example that point is the prow under water of a marine vessel and the system comprises an underwater sonar by which a sector area ahead of the vessel is searched for detecting presence and location (bearing and range) of underwater objects. In the example the search sector is approximately ninety degrees wide and is centered in the vertical midplane of the vessel. It may be assumed for convenience of analysis that the sector is laid out or extends in a horizontal plane or on the surface of a vertical-axis cone of selected apex angle so as to give panoramic coverage of the area lying ahead of the vessel.

In Figure 1 the search coverage sector may be regarded as being made up of nine successively adjacent zones or sector portions designated $a$ to $i$ inclusive, each being approximately ten degrees wide in the example. In accordance with the invention each of these sector portions is covered by a separate receiving transducer having a directionally selective response characteristic or beam pattern, such as those indicated very approximately by the dotted lines $a'$ to $i'$, inclusive. While there are nine such receiving transducers in the illustrated case which together cover the entire ninety-degree search sector, it will be understood that the angular width of the coverage sector may vary from a small angle to a full 360° according to design, and the transducer beam width, hence the number of receiving transducers covering any width sector may vary. Moreover, if greater angular resolution in one portion of a sector is desired, relatively narrow beam receiving transducers may be employed to cover that portion of the sector and relatively wide beam transducers to cover the remainder. These and other variations along those lines will be obvious to those familiar with the principles of sonar, radar and similar techniques.

Figure 2:
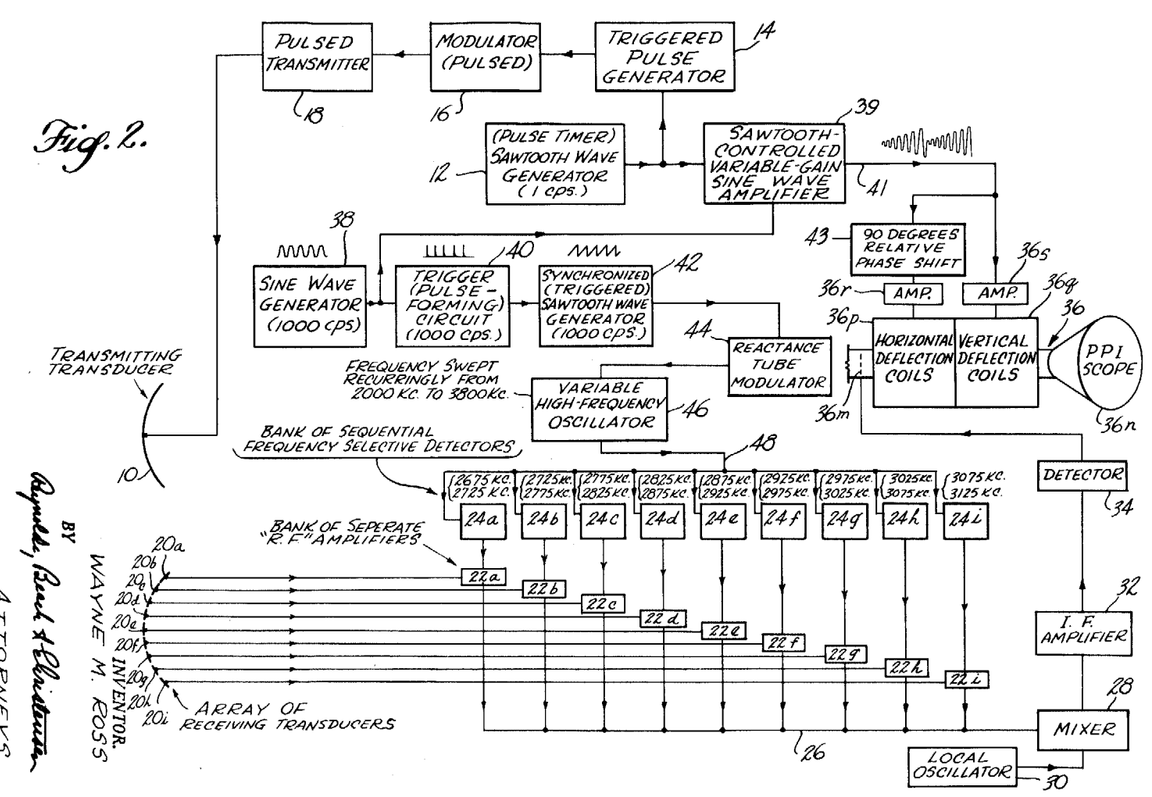
Figure 2 is a block diagram of the system.

In the system illustrated in Figure 2, the transmission of compressional wave energy into the search sector occurs as intermittent or periodic pulses of short duration relative to the intervals between successive pulses. Preferably this compressional wave energy, emitted by the transmitting transducer 10 with uniform intensity into all portions of the total search sector (90 degrees wide in the example), occurs at ultrasonic frequency, such as in the order of from thirty to one hundred kilocycles per second, more or less. The frequency selected is unimportant for purposes of the invention. Timing of these recurring pulses is established by the sawtooth wave generator 12 which generates a sawtooth wave form of selected frequency. For a maximum system range of approximately 2,000 feet, this sawtooth wave frequency is preferably about one cycle per second, as indicated in the figure, so there will be no dead or lost time between successive pulses. This recurrence frequency may vary depending upon the maximum range desired and other well known considerations. The terminal edges of each sawtooth wave cycle are used to key a triggered pulse generator 14 which generates a rectangular voltage pulse and applies the same to the modulator 16 which operates the pulsed transmitter 18. The duration of pulses generated by the pulse generator 14 may vary, but at a 2,000-foot maximum range and one cycle per second pulse repetition rate a suitable pulse length is approximately three milliseconds. There are various considerations which enter into the selection of an optimum pulse length, and it is known that the pulse length preferably should be varied generally in proportion to the length of the interval between successive transmitted pulses for obtaining optimum results with a pulse-echo type detection system.

The nine receiving transducers used in the example, designated 20a to 20i, inclusive, are suitably mounted in an array which provides the type of beam coverage of the search sector illustrated in Figure 1. These receiving transducers may be in the form of substantially flat plates of barium titanate or other suitable piezoelectric material, or they may comprise elements of the magnetostrictive type. The same type of material or transducer element may be employed in the transmitting transducer, although the latter preferably takes the form of an arcuate plate curved and dimensioned to provide substantially uniform radiation of compressional wave energy into the search sector. The design considerations governing selection of transducer shape, size, etc., and the mountings and arrangement of the transducers are well known and need not be discussed in detail herein. If desired, the transmitting transducer 10 may be eliminated and by appropriate circuit arrangements the receiving transducers 20a to 20i, inclusive, may be employed in the capacity of simultaneously energized transmitting transducers as well as independent receiving transducers.

Reflected compressional wave energy incident on one or more of the directionally selective receiving transducers 20a et seq. produces mechanical vibrations in the body of the transducer element which are converted thereby into electrical oscillations of the same frequency. These electrical signals from the individual receiving transducers are applied to individual receiver amplifiers designated "R. F." amplifiers 22 in Figure 2. Thus receiving transducer 20a delivers its signals to R. F. amplifier 22a, receiving transducer 20b delivers its signals to R. F. amplifier 22b, etc. Each of these R. F. amplifiers, as later explained more fully, is normally biased negatively against operation, but by a sequential switching action taking place in the system, involving the operation of bias-overcoming circuits associated with the individual amplifiers, the latter are effectively "turned on" for short successive intervals in predetermined sequence a large number of times during each period between successive transmitted pulses. Such sequential switching action or commutation is produced by the bank of sequentially energized frequency selective detectors 24a, 24b, et seq. comprising the bias-overcoming circuits for the respective amplifiers 22a, 22b, etc. These amplifiers are all connected to a common output channel 26 by which their combined signals are applied to mixer 28 wherein they are mixed with the frequency of local oscillator 30 for application to the intermediate-frequency amplifier 32. The resulting I. F. signals are delivered at amplified level to the video detector 34 which converts them into direct or unipolarity voltage pulses for application to the electron beam intensity control grid 36m of cathode ray tube indicator 36, as shown.

The electron beam in cathode ray tube indicator 36 is normally suppressed to a low intensity such that little or no excitation of the fluorescent material on the cathode ray tube screen 36n occurs, but the application of a video pulse to intensity control grid 36m "turns on" the beam momentarily in order to produce a visible indication of the video signal on the screen.

Figure 3:
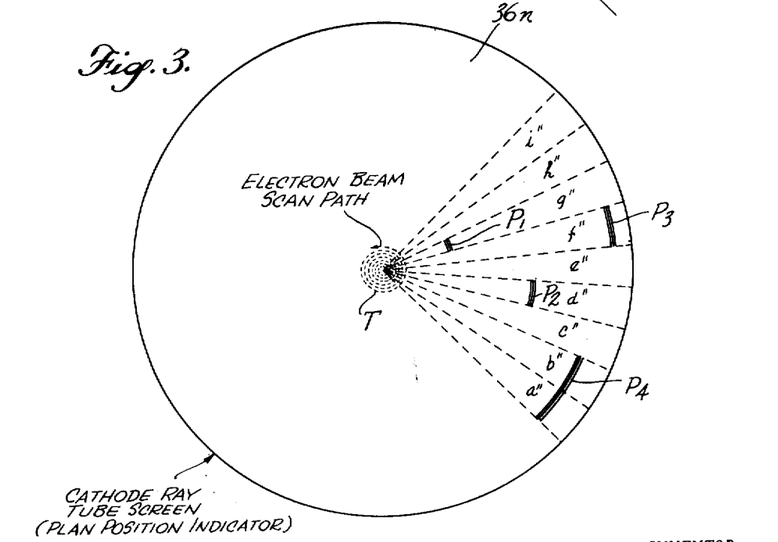
Figure 3 is a diagrammatic view of the cathode ray tube indicator screen in such a system which illustrates the preferred type of display.

The cathode ray tube indicator 36, designated "P. P. I.-scope," comprises two sets of electron beam deflecting elements represented in Figure 2 as horizontal deflection coils 36p and vertical deflection coils 36q. A sine wave generator 38 produces a continuous sine wave of selected frequency such as 1,000 cycles per second. This sine wave is fed to an amplifier 39 the gain of which is controlled at any instant by the instantaneous value of the sawtooth wave of generator 12. Thus the amplified output of the sine wave amplifier 39 applied to circuit conductor 41 is another sine wave, the amplitude of which varies progressively from zero or a relatively small value to a greater value recurringly at one cycle per second in the example. After further amplification this sawtooth-modulated sine wave is applied to the vertical deflection coils 36q and to the horizontal deflection coils 36q with 90 degrees phase separation effected by the relative phase shift network 43. Consequently the electron beam in the cathode ray tube indicator 36 executes a spiral trace relative to the cathode ray tube screen 36n as shown in Figure 3, wherein the dotted line T indicates the trace path on the screen. It will be appreciated that the spacing between successive progressively widening circles of the spiral trace will be extremely small so as to be hardly discernible in the actual case of a sine wave generator 38 producing 1,000 cycle per second since waves while the sawtooth generator 12 produces only one cycle per second sawtooth waves. In other words, if all the electron beam sweep circles are contained on the area of the cathode ray tube screen 36n by properly limiting the maximum amplitude of the sawtooth modulated sine wave applied to conductor 41, there will be 1,000 revolutions of the electron beam about the axis of the tube in producing the composite spiral scan and the spacing between adjacent beam traces will be very slight.

Sawtooth wave generator 38 also delivers its output to a pulse-forming circuit 40 in which sharp keying or trigger pulses, recurring at the 1,000 cycles per second sine wave frequency, are produced for application to a triggered sawtooth wave generator 42. The resulting 1,000 cycles per second sawtooth wave is applied to the reactance tube modulator 44 which controls the frequency of the variable frequency oscillator 46. In the example the frequency range of this oscillator produced by the sawtooth-controlled reactance tube modulator extends from 2,000 to 3,800 kilocycles per second, these figures being selected merely for purposes of illustration and being subject to change in accordance with preference or choice. Oscillator 46 delivers this variable-frequency sine wave through the channel 48 to all the frequency selective detectors 24a, 24b, etc., each of which is tuned to a different fractional portion of the total range of frequency variation of oscillator 46. Thus detector 24a is tuned to respond to frequencies within the range approximately from 2,675 to 2,725 kilocycles per second, detector 24b to frequencies in the range approximately between 2,725 to 2,775 kilocycles per second, etc., each such detector covering successive portions (50 kilocycles wide) of the total band or range of frequency variation.

When during a cycle of frequency variation of oscillator 46 the frequency thereof passes through the range to which a particular detector is sensitive, such detector produces a bias-overcoming voltage applied to the associated "R. F." amplifier 22, and momentarily renders the latter operative as an amplifier so that any echo signals impressed thereon by the associated receiving transducer will be amplified and applied to the mixer 28 during that short interval. Thus the amplifiers 22 which are normally cut off by negative bias will be "turned on" momentarily in sequence, determined by the tuning sequence of their respectively associated detectors 24, 1,000 times per second, that is, 1,000 times in the interval between successive transmitted pulses in the illustrative system. With a pulse length of three milliseconds the minimum duration of all echo signals will be three milliseconds, and each echo signal will therefore be impressed at least three times on the common receiver channel 26 under the assumption stated.

It will be noted that the same sine wave controls the timing of sawtooth wave generator 42 and the timing of the progressively widening circular sweeps of the electron beam in the cathode ray tube. Thus by a proper tuning arrangement of the detectors 24 associated with individual receiving transducers 20a, 20b, etc., the circular sweep movement of the electron beam on the cathode ray tube screen traverses the same angular sector of the screen every time a particular R. F. amplifier 22 is "turned on," and these sectors of the screen are positively related to each other as the successively adjacent portions a, b, c, etc. of the search sector covered by the system as illustrated in Figure 1. Thus the cathode ray screen may be graphically divided or marked with sectors a", b", c", etc. (Figure 3) to represent the correspondingly identified sectoral portions in Figure 1. For reasons previously explained, each echo signal incident upon a particular receiving transducer produces a minimum of three applications of signal voltage to the mixer 28, and these appear as three radially aligned arcs closely grouped, in fact merged together for all practical purposes due to the close spacing of the successive circular sweep traces, as a representation of the particular reflecting object producing the signal. Thus in Figure 3 the groups of signals P1, P2 and P3 in sectors g, d and f, respectively, represent three different reflecting objects in the search sector of the system.

The radial displacement from screen center of these signal groups constitutes a measure of range of the particular reflecting objects because of the known rate of expansion of the spiral beam trace as a function of time commencing with each transmitted pulse. At the same time, their angular location on the screen constitutes an indication of the bearings of the particular reflecting objects. Of course, if a reflecting object falls equally within the beams of adjacent receiving transducers a signal, such as P4, may appear on the cathode ray tube screen, occupying the two mutually adjacent angular sectors of the screens. As the object moves more fully into one of these space sectors the indication in the other sector will fade out. Obviously, the more narrow the receiving transducer beams, hence the greater the number of these beams required to cover the total search sector, the greater the angular resolving power of the system.

It will also be noted that instead of producing a spiral sweep of the electron beam a pure circular sweep may be used in conjunction with either continuous wave or pulsed operation of the system transmitter. In this case the angular position, but not the range of reflecting objects would be indicated on the cathode ray tube screen. The only change in the illustrated system for accomplishing this conversion would be the by-passing of amplifier 39 by the output of sine wave generator 38. It is further apparent that still other cathode ray tube indication methods may be used involving variant beam sweep configurations or deflection techniques, wherein sequence switching of the amplifiers 22 is synchronized with or related to electron beam deflection.

Figure 4:
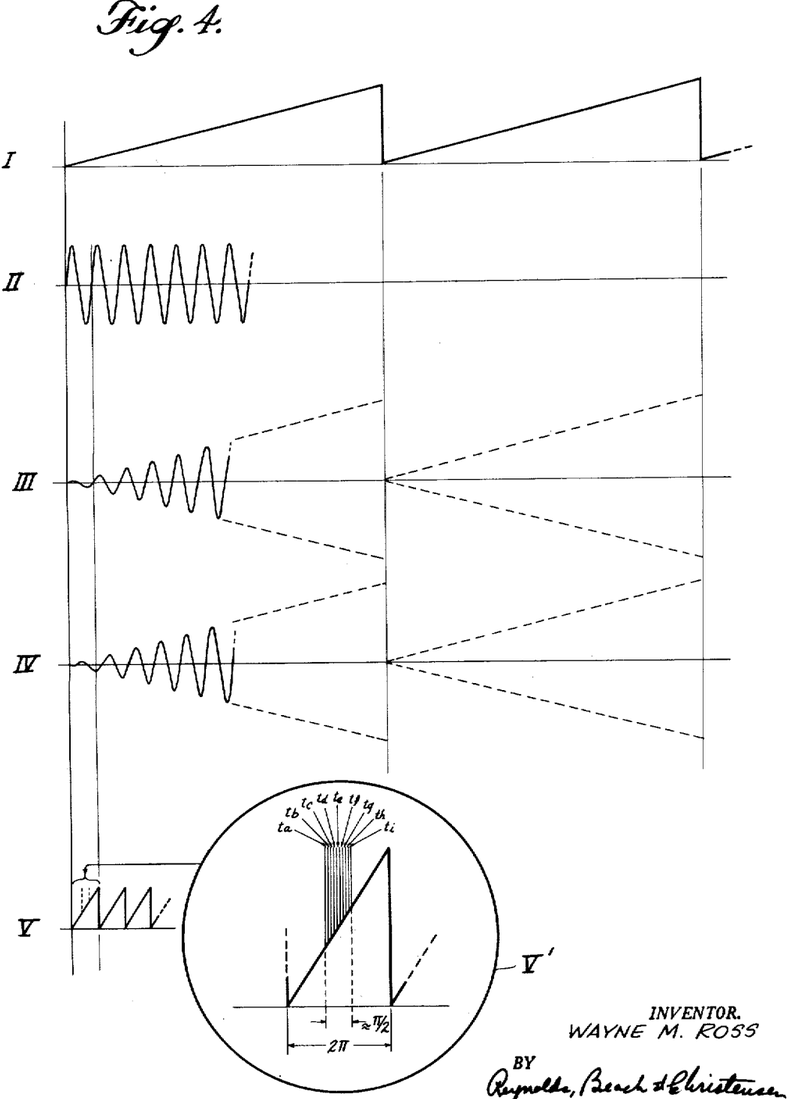
Figure 4 is a group of wave diagrams which help explain the system operation in Figure 3.
Figure 5:
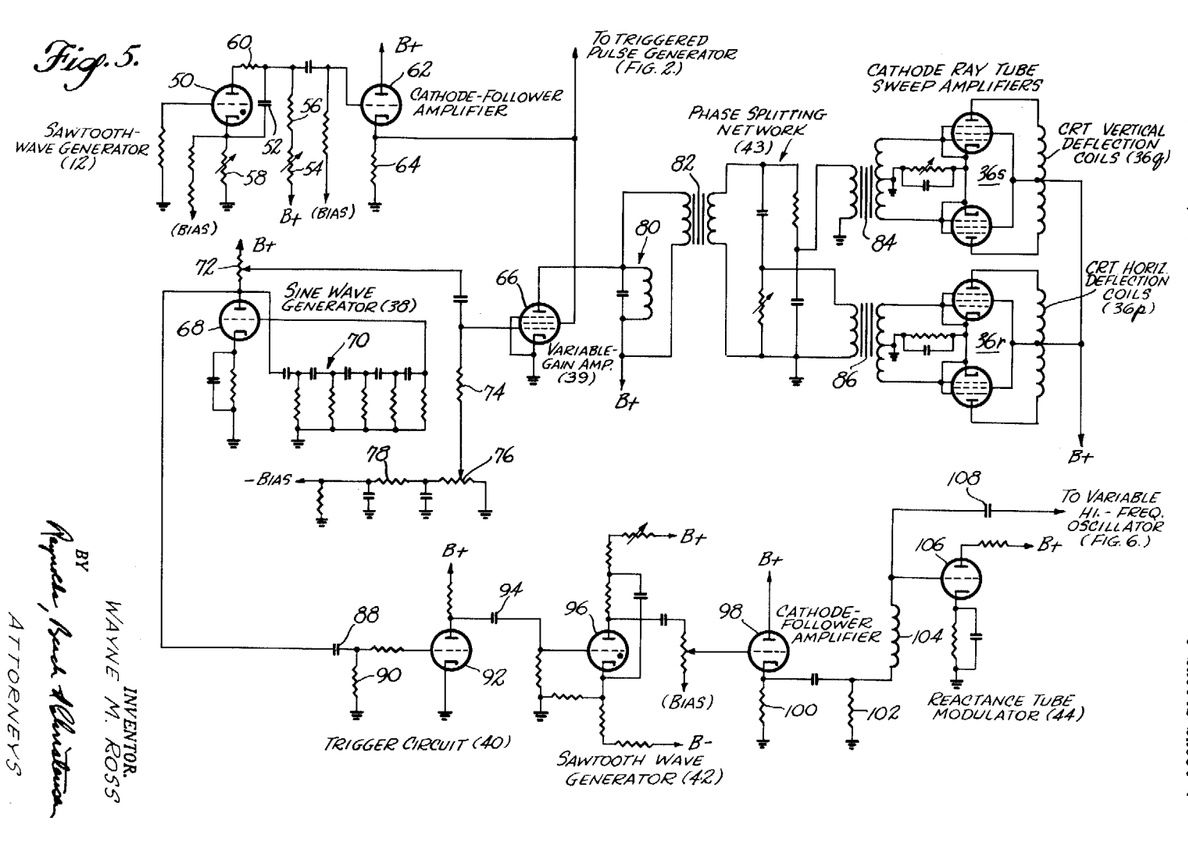
Figures 5 and 6 are related schematic circuit diagrams which together comprise the system illustrated in Figure 3.
Figure 6:
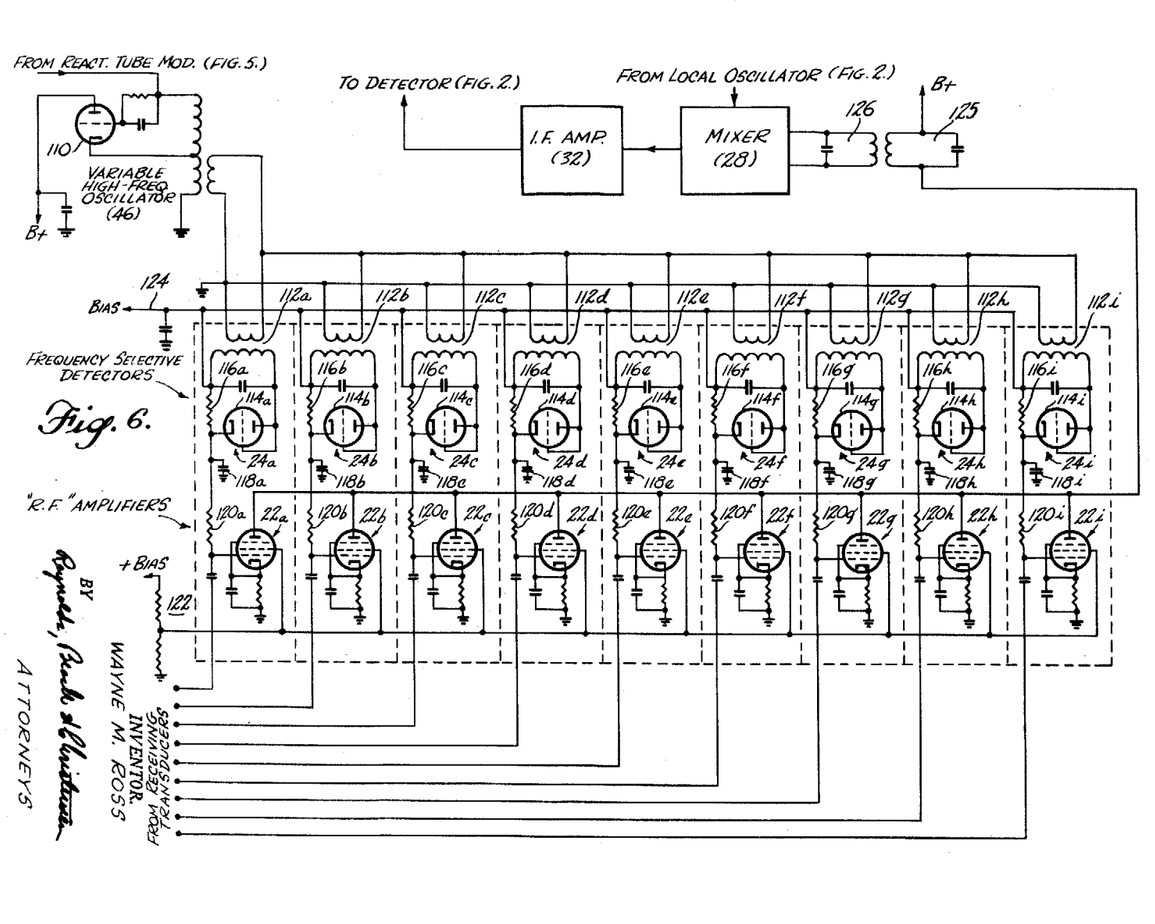

Referring now to Figures 4, 5 and 6 for more details of the specific system illustrating the invention, sawtooth generator 12 comprises a relaxation oscillator employing gaseous discharge triode 50 and a storage condenser 52, which progressively charges at a substantially linear rate through series resistors 54, 56, and 58 until the condenser voltage, applied across anode and cathode of tube 50, causes ionization in the tube. At this instant the condenser 52 suddenly discharges through the triode 50 and series current-limiting resistor 50. Resistors 58 and 54 are of the variable type permitting of adjustment of sawtooth sweep amplitude and recurrence rate. The junction between condenser 52 and resistor 56 is capacitatively coupled to the control grid of amplifier 62 connected as a cathode follower having a relatively high input impedance and low load resistance 64. The resultant sawtooth wave appearing at the cathode of tube 62 is applied both to the triggered pulse generator 14 (Figure 2) and to the second control grid of pentode amplifier tube 66 comprising the variable gain sine wave amplifier 39 in Figure 2. The triggered pulse generator shown in block form only in Figure 2 may be of any suitable type, such as a triggered Eccles-Jordan circuit or multivibrator, for example.

The first control grid of pentode amplifier tube 66 receives a sine wave voltage of constant frequency (1,000 cycles per second in the example) from sine wave generator 38 comprising the triode amplifier tube 68 and the phase shift R–C network 70 connected together to form a phase-shift type oscillator. The plate load resistance of oscillator tube 68 comprises the winding of a potentiometer 72 permitting a selection of the amplitude of the sine wave to be applied to the first grid of tube 66. The grid leak resistor 74 connected to the same grid is connected to the wiper of a variable bias potentiometer 76 across which a suitable negative bias voltage is applied over a filter network 78 preventing any fluctuations in gain of amplifier 39 due to power supply fluctuations. Consequently the gain of pentode 66 as a sine wave amplifier is varied solely by the sawtooth voltage wave applied to the second control grid of this tube, and sawtooth modulated sine waves are produced in the tuned L–C plate load circuit of the amplifier for application to the primary winding of transformer 82. Preferably the modulated sine wave amplitude varies between substantially zero and a desired maximum value, and by proper selection of the constants in sawtooth wave generator 12 such variation is made substantially linear as a function of time.

This amplitude modulated sine wave of 1,000 cycles per second is applied, with ninety degrees phase difference, to the respective primaries of transformers 84 and 86, the secondaries of which are connected to the control grids of push-pull pentode amplifiers 36s and 36r for driving the cathode ray tube vertical and horizontal deflection coils, respectively. Splitting the phase of the sawtooth modulated sine waves for application to transformers 84 and 86 is accomplished in a conventional phase-splitting network 43 comprising the illustrated parallel R–C branch circuits connected across the secondary winding of transformer 82 with the condensers and resistors in the two branches positioned reversely to each other. The connections in the cathode ray tube sweep amplifiers are such that the vertical and horizontal deflection coils 36q and 36p carry sine wave currents of 90-degree phase difference, respectively, which currents recurrently vary from substantially zero sine wave amplitude to a maximum sine wave amplitude so adjusted that the circular sweep of the electron beam progressively widens from substantially zero at the beginning of the pulse repetition cycle to substantially the full radius of the cathode ray tube screen at the termination of such cycle. As previously mentioned, therefore, the electron beam executes a spiral scan at the one cycle per second fundamental sawtooth recurrence rate.

The sine waves from generator 38 are also applied to the trigger circuit 40 comprising the condenser 88 and resistor 90 connected as a differentiating circuit, and the triode amplifier 92 operable to sharply peak the positive differential voltage pulses appearing at its control grid and to eliminate the negative differential pulses. The resultant sharply peaked positive pulses appearing at the anode of amplifier 92 are coupled through condenser 94 to the control grid of sawtooth generator tube 96 comprising a gaseous discharge tube. This sawtooth generator is also of the relaxation oscillator type, although the bias is such in this instance that the oscillator is adjusted to be recycled by the trigger pulses from amplifier 92 instead of to be self-oscillating. In other respects this sawtooth generator is similar to the sawtooth generator 12 and furthermore is of conventional type so as to require no particular description herein. However, the time constants in its circuit are so adjusted that it is capable, when cyclically triggered, of producing substantially linear sawtooth waves at a frequency of 1,000 cycles per second, the frequency of sine wave generator 38. As in the previous case this sawtooth generator also comprises a cathode follower stage 98 having a relatively small load resistance 100, from which the 1,000 cycle sawtooth waves are derived for application, through a high-frequency filter comprising resistor 102 and choke 104 to the control grid of the amplifier tube 106 of reactance tube modulator 44. This reactance tube modulator may be of conventional form having its control grid connected through a capacitor 108 to the tuned circuit of the variable high frequency oscillator shown in Figure 6 and comprising the tube 110 connected in a conventional electron-coupled oscillator circuit or similar oscillator arrangement.

Oscillator 46, designed in the illustrative case to operate in the range between 2,000 and 3,800 kilocycles per second, and to be swept in frequency recurringly throughout said range by the 1,000 cycle per second sawtooth wave effect in the reactance tube modulator 44, feeds its output, at substantially constant amplitude, to the primary windings of the input transformers 112a, 112b, etc. of all the frequency selective detectors 24a, 24b, etc., respectively. The secondary windings of these transformers are shunted by tuning condensers of successively different sizes, so that the detectors are tuned to successively different frequencies within the range of oscillator 46. These detectors are conventional diode-connected triode detectors comprising the tubes 114a, 114b, etc., having load resistors 116a, 116b, etc., and filter condensers 118a, 118b, etc.

"R. F." amplifiers 22a, 22b, etc., are in the form of pentode amplifiers having a common bias source 122 for their screen grids and having their respective control grids connected through resistors 120a, 120b, etc. to output points of the respective bias-overcoming detectors 24a, 24b, etc. Amplifier negative bias voltage supplied to common bias conductor 124 by a suitable voltage source (not shown) is normally applied to the control grids of the respective amplifiers 22a, 22b, etc., through the related resistors 116 and 120 connected in series. The series resistors furnish a grid-leak path for the amplifier tubes in each of the amplifier circuits, as well as for bias application purposes. When the varying frequency of oscillator 46 sweeps into and through the tuning range first of detector 24a, the diode 114a therein conducts and a bias-overcoming voltage is developed across the resistor 116a in series with such tube, so as to render the associated amplifier 22a sensitive to the weak ultrasonic energy electric signals applied to its control grid from the corresponding receiving transducer (see Figure 2). The negative bias of amplifier 22a is restored as the oscillator frequency sweeps beyond the tuned response range of detector 24a and into that of the next detector 24b, rendering amplifier 22b sensitive. In like manner each of the remaining amplifiers in turn are rendered sensitive to receiving transducer signals, the entire sequence recurring at the 1,000 cycle per second sawtooth wave frequency. Preferably the tuning of the detector circuits is made such that there will be no appreciable overlap in point of time of the response of one amplifier with the responses of adjacent amplifiers in the series. Likewise, it is desirable that there be no appreciable time lapse between the controlled responses of successively adjacent amplifiers in the series.

All amplifiers receive plate current through a common load impedance comprising the tuned circuit 124 which delivers the amplified output signals to the tuned input circuit 126 of mixer 28.

Figure 4 illustrates the timing of events in the operation of such a system. In graph I the fundamental pulse-timing sawtooth wave produced by generator 12 is illustrated. This wave is applied to control the gain variation of the sine wave amplifier 40 and also establishes the pulse repetition rate in the system. In graph II the sine wave to be amplified is depicted, while in graphs III and IV the sawtooth-modulated amplified sine waves, of ninety-degree relative phasing, are depicted. For convenience only a few of these wave cycles are illustrated, and these are greatly expanded on the time scale.

In graph V the 1,000 cycle per second sawtooth wave is depicted in its proper phase relationship with the sine wave in graph II, which controls the timing of the sawtooth wave. The enlargement shown in the expanded view V' of one sawtooth wave cycle illustrates the sequential timing of the operation of amplifiers 22a, 22b, etc., effected by this sawtooth wave during each sweep of the cathode ray tube electron beam. Thus the sawtooth wave duration in graph V is represented as $2\pi$ radians, whereas the active portion (i. e. during which amplifiers 22 are sensitized) of the sawtooth wave cycle is approximately one-fourth the wave period, corresponding to the ninety-degree search sector width and the related ninety-degree display sector on the cathode ray tube indicator. During the first approximately one-ninth of this active portion of the sweep, designated $t_a$, amplifier 22a is rendered sensitive and the electron beam is sweeping through sector $a''$ on the cathode ray tube screen (Figure 3). During the succeeding one-ninth of the active period the amplifier 22b is sensitized as the spiral trace of the electron beam next moves across the adjacent sector $b''$. This process continues until all nine of the sweep sectors have been traversed and all nine of the amplifiers, in proper sequence, sensitized in synchronism therewith. During the remaining portion of the sweep the electron beam is blanked or cut off as are the amplifiers 22a, 22b, etc. Of course, if the same system employed thirty-six instead of nine receiving transducers, each arranged to cover successively adjacent 10-degree sectors of the full 360° surrounding the point of detection, it will be obvious that the entire face of the cathode ray tube screen would be taken up for the presentation of data representing the signals of reflecting objects in the entire area surrounding the system location. Normally only a forward search sector is of interest in marine sonar, however, and the wake of the vessel tends to screen objects to the rear.

One particular advantage of employing the frequency selective detectors 24 as a means of overcoming the bias of the "R—F" amplifier stages, as against other possible commutation or switching circuits for rendering these amplifiers sensitive in sequence, is the comparative absence of high-frequency transients or harmonics of the same order of frequency as the ultrasonic signals themselves in the amplifier input leads. Thus these frequency selective detective controlled by the frequency modulated wave of oscillator 46 provide a somewhat rounded, hence relatively disturbance-free bias-overcoming pulse which, lacking high-order harmonics, does not obscure echo signals.

For conventional reasons the invention has been illustratively described herein by reference to a specific yet presently preferred form, but it will be appreciated that certain variations and changes therein, some mentioned and others not, may be readily conceived and practiced without departing from the scope of the inventive subject matter as defined in the accompanying claims.

I claim as my invention:

1. A detecting system utilizing the reflections of transmitted wave energy for locating reflecting objects, comprising transmitter means operable for periodically generating propagative wave energy pulses and beaming such energy pulses into a total search region, a plurality of directionally selective receiving devices aligned in different directions included in said total search region, said receiving devices being responsive to reflected wave energy incident thereon in their respective directions of selectivity, indicator means having a display representing said total search region, said display being divided into different portions individually representative of the different directional portions of said region corresponding to the individual receiving devices, respectively, sweep circuit means recurringly scanning said indicator display portions in predetermined successive order, said indicator means having an input energizable to produce an indication on any individual display portion being scanned during the instant of such input energization, a plurality of amplifiers respectively associated with the individual receiving devices to amplify the responses thereof, said amplifiers having output circuits energizingly connected to said indicator input, said amplifiers being normally substantially inoperative to energize said indicator display portions by receiver response, and sweep circuit means synchronized cycle for cycle with the first-mentioned sweep circuit means and recurringly scanning said amplifiers to render the same momentarily operative in predetermined successive instants corersponding to the order of instants of scan of said indicator display portions related thereto, the total interval between initiation of successive scan cycles of said sweep circuits being shorter substantially than the duration of the transmitted pulse, and the scan cycles of said sweep circuits being repeated a plurality of times during each period between successive transmitted pulses.

2. A detecting system utilizing the reflections of compressional wave energy for locating reflecting objects, comprising transmitter means operable for periodically generating propagative wave energy pulses and emitting such energy pulses into a total search region, a plurality of directionally selective receiving devices aligned in adjacent fractional sectors of said total search region, said receiving devices being responsive to reflected wave energy incident thereon in their respective directions of selectivity, a cathode ray tube having a luminescent screen representing said total search region, said screen including different portions individually representative of the different directional portions of said region corresponding to the responses of individual receiving devices, respectively, sweep circuit means recurringly scanning said adjacent portions of said luminescent screen in predetermined successive order, said indicator means having an input energizable to produce an indication on any individual portion of said screen being scanned during the instant of such input energization, a plurality of amplifiers respectively associated with individual receiving devices to amplify the responses thereof, said amplifiers having output circuits energizingly connected to said indicator input, said amplifiers being normally substantially inoperative to energize said portions of said screen by receiver response, and sweep circuit means synchronized cycle for cycle with the first mentioned sweep circuit means and recurringly scanning said amplifiers to render the same momentarily operative in predetermined successive instance corresponding to the order of instants of scan of said portions of said luminescent screen related thereto, said sweep circuits operating at a frequency producing at least two complete scans of the luminescent screen and related amplifiers in a period representing the duration of the transmitted pulse.

3. A detecting system utilizing the reflections of transmitted compressional wave energy for locating reflecting objects, comprising transmitter means operable for beaming a pulse of compressional wave energy into a search sector, a plurality of receiving devices directionally selective to reflected compressional wave energy returning to the system in successively adjacent portions of said search sector respectively for producing a response therefrom, an indicator of the cathode ray tube type having a viewing screen, means for sweeping the electron beam of said cathode ray tube along a selected path of impingement thereof on said viewing screen recurringly following said pulse transmission, the periods between initiation of successive sweeps of the electron beam being of a duration not greater than one-half the transmitted pulse duration, and cathode ray tube beam control means operated synchronously with said sweep means and sequentially converting the individual receiver responses into visible effects of said beam sweep respectively related to the successively adjacent portions of said search sector, said beam control means comprising a plurality of translating devices having output terminals connected in a common channel for visibily affecting the electron beam and having separate input terminals individually connected to the different receiving devices, respectively, whereby said translating devices operate to translate the responses of said receiving devices into cathode ray tube beam control signals, said translating devices being normally biased against such operation, bias-overcoming circuits associated with the individual translating devices respectively operable in response to a progressively varying control signal applied thereto for overcoming the bias on said translating devices in predetermined successive order, said bias-overcoming circuits comprising rectifier elements and frequency-selective filters energizingly connected to said rectifier elements, respectively, the tuned filters of such circuits being tuned to successively different frequencies, and means for generating such a control signal recurringly in the period immediately folowing a transmitted pulse, said control signal generating means comprising oscillator means and means recurringly modulating the frequency of said oscillator means through a predetermined range of variation including the tuned frequencies of the filter elements.

4. The detecting system defined in claim 3, wherein the cathode ray tube beam is intensity modulated by energization of the indicator input, and means cycled with the transmitter means, progressively sweeping the electron beam of the cathode ray tube in a sense generally transverse of the first mentioned sweep sense once during each interval between successive transmitted pulses.

5. The detecting system defined in claim 2, wherein the first mentioned sweep means generates a circular path of the electron beam on the cathode ray tube screen and the last mentioned sweep means produces a progressive change in the diameter of the sweep path circles, thereby producing a resultant spiral sweep trace on the cathode ray tube screen.

6. A detecting system utilizing the reflections of transmitted compressional wave energy for locating reflecting objects, comprising transmitter means operable for emitting a pulse of compressional wave energy into a search sector, a plurality of receiving devices directionally selective to reflected compressional wave energy returning to the system in successively adjacent portions of said search sector respectively for producing a response therefrom, an indicator of the cathode ray tube type having a viewing screen, first means including circuit apparatus for generating sine and cosine function voltage waves applied to perpendicularly related cathode ray tube electron beam deflection elements, for sweeping the electron beam of said cathode ray tube along a selected path of impingement thereof on said viewing screen recurringly following said pulse transmission, the periods between initiation of said successive sweeps of the electron beam being of a duration not greater than one-half the transmitted pulse duration, second means sweeping the electron beam of the cathode ray tube relatively slowly in a sense progressively displacing the previously mentioned selected sweep paths substantially transversely to itself on the viewing screen as a function of time following each pulse transmission, said second sweeping means comprising circuit apparatus for modulating the amplitude of said sine and cosine function voltage waves progressively as a function of time, and cathode ray tube beam control means operated synchronously with said sweep means and sequentially converting the individual receiver responses into visible effects of said beam during successively connected portions of the beam sweep respectively related to the successively adjacent portions of said search sector.

7. The detecting system defined in claim 6, wherein the beam control means comprises a plurality of translating devices having output terminals connected in a common channel for visibly affecting the electron beam and having separate input terminals individually connected to the different receiving devices respectively, whereby said translating devices operate to translate the responses of said receiving devices into cathode ray tube beam control signals, said translating devices being normally biased against such operation, bias overcoming circuits associated with the individual translating devices respectively operable in response to a progressively varying control signal applied thereto for overcoming the bias on said translating devices in predetermined successive order, and means for generating such a control signal recurringly in the period immediately following a transmitted pulse, said bias overcoming circuits comprising rectifier elements and frequency selective filters energizingly connected to said rectifer elements, respectively, the tuned filters of such circuits being tuned to successively different frequencies, and the control signal generator comprising oscillator means and means recurringly modulating the frequency of said oscillator means through a predetermined range of variation including the tuned frequencies of the rectifier elements.

8. A detecting system comprising means for transmitting compressional wave energy pulses of predetermined pulse duration of the order of a few milliseconds more or less at intervals into a search sector, a plurality of individual receiver devices directionally responsive to reflected compressional wave energy from successively adjacent portions of said sector, respectively, and indicator means energizable by said receiver devices individually to produce separate indications for each thereof, and means controlling energization of said indicator means, recurringly applying the outputs of said receiver devices in predetermined sequence to said indicator means a large number of times during each interval between successive pulses, the interval between initiation of succesisve sequences being a fraction of the transmitted pulse duration.

9. A detecting system utilizing the reflections of transmitted compressional wave energy for locating reflecting objects, comprising transmitter means operable for beaming compressional wave energy into a search sector, a plurality of receiving devices directionally selective to reflected compressional wave energy returning to the system in successively adjacent portions of said search sector respectively for producing a response therefrom, an indicator of the cathode ray tube type having a viewing screen, means for sweeping the electron beam of said cathode ray tube along a selected path of impingement thereof on said viewing screen recurringly following said energy transmission, said sweep means comprising circuit apparatus for generating sine and cosine function voltage waves applied to perpendicularly related cathode ray tube electron beam deflection elements, and cathode ray tube beam control means operated synchronously with said sweep means and sequentially converting the individual receiver responses into visible effects of said beam during successively connected portions of the beam sweep respectively related to the successively adjacent portions of said search sector, said beam control means comprising a plurality of translating devices having output terminals connected in a common channel for visibly affecting the electron beam and having separate input terminals individually connected to the different receiving devices, respectively, whereby said translating devices operate to translate the responses of said receiving devices into cathode ray tube beam control signals, said translating devices being normally biased against such operation, bias-overcoming circuits respectively connected to the individual translating devices and energizable for overcoming the bias on said translating devices, said bias-overcoming circuits comprising rectifier elements and frequency selective filters energizingly connected to said rectifier elements, respectively, the tuned filters of such circuits being tuned to successively different frequencies, and a control signal generator connected for energizing said bias-overcoming circuits in predetermined order, comprising oscillator means and means recurringly modulating the frequency of said oscilaltor means through a predetermined range of variation including the tuned frequencies of the rectifier elements.

10. A detecting system utilizing the reflections of transmitted compressional wave energy for locating reflecting objects, comprising transmitter means operable for beaming a pulse of compressional wave energy into a search sector, a plurality of receiving devices directionally selective to reflected compressional wave energy returning to the system in successively adjacent portions of said search sector respectively for producing a response therefrom, an indicator of the cathode ray tube having a viewing screen, means for sweeping the electron beam of said cathode ray tube along a selected path of impingement thereof on said viewing screen recurringly following said pulse transmission, said beam sweep means comprising circuit apparatus for generating sine and cosine function voltage waves applied to perpendicularly related cathode ray tube electron beam deflection elements, each such sweep of the electron beam occurring in a period of time not greater than the transmitted pulse duration, cathode ray tube beam control means operated synchronously with said sweep means and sequentially converting the individual receiver responses into visible effects of said beam during successive connected portions of the beam sweep respectively related to the successively adjacent portions of said search sector, and means sweeping the electron beam of the cathode ray tube relatively slowly in a sense progressively displacing the previously mentioned selective sweep path substantially transversely to itself on the viewing screen as a function of time following each pulse transmission, said last-mentioned sweep means comprising circuit apparatus for modulating the amplitude of said voltage waves progressively as a function of time, said beam control means comprising a plurality of translating devices having output terminals connected in a common channel for visibly affecting the electron beam and having separate input terminals individually connected to the different receiving devices respectively, whereby said translating devices operate to translate the responses of said receiving devices into cathode ray tube beam control signals, said translating devices being normally biased against such operation, bias-overcoming circuits associated with the individual translating devices respectively operable in response to a progressively varying control signal applied thereto for overcoming the bias on said translating devices in predetermined successive order, and means for generating such a control signal recurringly in the period immediately following a transmitted pulse.

11. A detecting system utilizing the reflections of transmitted compressional wave energy for locating reflecting objects, comprising transmitter means operable for emitting a pulse of compressional wave energy into a search sector, a plurality of receiving devices directionally selective to reflected compressional wave energy returning to the system in successively adjacent portions of said search sector respectively for producing a response therefrom, an indicator of the cathode ray tube type having a viewing screen, means for sweeping the electron beam of said cathode ray tube along a selected path of impingement thereof on said viewing screen recurringly following said pulse transmission, said beam sweep means comprising circuit apparatus for generating sine and cosine function voltage waves applied to perpendicularly related cathode ray tube electron beam deflection elements, each of such sweep of the electron beam occurring in a period of time not greater than the transmitted pulse duration, cathode ray tube beam control means operated synchronously with said sweep means and sequentially converting the individual receiver responses into visible effects of said beam during successive connected portions of the beam sweep respectively related to the successively adjacent portions of said search sector, and means sweeping the electron beam of the cathod ray tube relatively slowly in a sense progressively displacing the previously mentioned selective sweep path substantially transversely to itself on the viewing screen as a function of time following each pulse transmission, said last mentioned sweep means comprising circuit apparatus for modulating the amplitude of said voltage waves progressively as a function of time, said beam control means comprising a plurality of translating devices having output terminals connected in a common channel for visibly affecting the electron beam and having separate input terminals individually connected to the different receiving devices, respectively, whereby said translating devices operate to translate the responses of said receiving devices into cathode ray tube beam control signals, said translating devices being normally biased against such operation, bias overcoming circuits associated with the individual translating devices respectively operable in response to a progressively varying control signal applied thereto for overcoming the bias on said translating devices in predetermined successive order, said bias overcoming circuits comprising rectifier elements and frequency selective filters energizingly connected to said rectifier elements, respectively, the tuned filters of said circuits being tuned to successively different frequencies, and means for generating such a control signal recurringly in the period immediately following a transmitted pulse, comprising oscillator means and means recurringly modulating the frequency of said oscillator means through a predetermined range of variation including the tuned frequencies of the rectifier elements.

12. A detecting system utilizing the reflections of transmitted compressional wave energy for locating reflecting objects, comprising transmitter means operable for beaming a pulse of compressional wave energy into a search sector, a plurality of receiving devices directionally selective to reflected compressional wave energy returning to the system in successively adjacent portions of said search sector respectively for producing a response therefrom, an indicator of the cathode ray tube type having a viewing screen, means for sweeping the electron beam of said cathode ray tube along a selected path of impingement thereof on said viewing screen recurringly following said pulse transmission, each such sweep of the electron beam occurring in a period of time not greater than the transmitted pulse duration, and cathode ray tube beam control means operated synchronously with said sweep means and sequentially converting the individual receiver responses into visible effects of said beam during successively connected portions of the beam sweep respectively related to the successively adjacent portions of said search sector, said beam control means comprising a plurality of translating devices having output terminals connected in a common channel for visibly affecting the electron beam and having separate input terminals individually connected to the different receiving devices, respectively, whereby said translating devices operate to translate the responses of said receiving devices into cathode ray tube beam control signals, said translating devices being normally biased against such operation, bias-overcoming circuits associated with the individual translating devices respectively, operable in response to a progressively varying control signal applied thereto for overcoming the bias on said translating devices in predetermined successive order, said bias-overcoming circuits comprising rectifier elements and frequency-selective filters energizingly connected to said rectifier elements, respectively, the tuned filters of such circuits being tuned to successively different frequencies, and a control signal generator energizingly connected to said bias-overcoming circuits and comprising oscillator means and means recurringly modulating the frequency of said oscillator means through a predetermined range of variation, including the tuned frequencies of the rectifier elements, recurringly in the period immediately following a transmitted pulse.

References Cited in the file of this patent

UNITED STATES PATENTS

| | | |
|---|---|---|
| 2,433,332 | Benioff | Dec. 30, 1940 |
| 2,473,974 | Schuck | Jan. 21, 1949 |
| 2,539,413 | Fischer | Jan. 30, 1951 |
| 2,564,694 | Huber | Aug. 21, 1951 |
| 2,592,738 | Rich | Apr. 15, 1952 |
| 2,703,396 | Rich | Mar. 1, 1955 |

U. S. DEPARTMENT OF COMMERCE
PATENT OFFICE
CERTIFICATE OF CORRECTION

Patent No. 2,767,386

October 16, 1956

Wayne M. Ross

It is hereby certified that error appears in the printed specification of the above numbered patent requiring correction and that the said Letters Patent should read as corrected below.

Column 11, line 73, for "initiation of suc-" read -- initiation of --; column 12, line 25, for "folowing" read -- following --; column 13, line 39, for "succesisve" read -- successive --; column 14, line 17, after "tube" insert -- type --.

Signed and sealed this 20th day of May 1958.

(SEAL)
Attest:

KARL H. AXLINE

Attesting Officer

ROBERT C. WATSON
Commissioner of Patents